US008135491B2

(12) United States Patent
Scherer

(10) Patent No.: US 8,135,491 B2
(45) Date of Patent: Mar. 13, 2012

(54) METHOD, SYSTEM AND APPARATUS FOR ON-DEMAND INTEGRATED ADAPTIVE CONTROL OF MACHINING OPERATIONS

(75) Inventor: Jerry Gene Scherer, Ashton, IL (US)

(73) Assignee: Fanuc FA America Corporation, Hoffman Estates, IL (US)

( * ) Notice: Subject to any disclaimer, the term of this patent is extended or adjusted under 35 U.S.C. 154(b) by 0 days.

(21) Appl. No.: 13/056,804

(22) PCT Filed: Jul. 2, 2009

(86) PCT No.: PCT/US2009/049572
§ 371 (c)(1),
(2), (4) Date: Jan. 31, 2011

(87) PCT Pub. No.: WO2010/014348
PCT Pub. Date: Feb. 4, 2010

(65) Prior Publication Data
US 2011/0137448 A1    Jun. 9, 2011

(51) Int. Cl.
*G06F 19/00* (2011.01)
*B23Q 11/00* (2006.01)
(52) U.S. Cl. .................. 700/173; 409/141
(58) Field of Classification Search .............. 700/173; 409/141
See application file for complete search history.

(56) References Cited

U.S. PATENT DOCUMENTS

| | | | | |
|---|---|---|---|---|
| 3,744,353 A | * | 7/1973 | Rohs ............................... | 82/118 |
| 5,638,304 A | * | 6/1997 | Billoud ........................... | 702/56 |
| 5,957,016 A | * | 9/1999 | Segalman et al. ............... | 82/1.11 |
| 6,190,098 B1 | | 2/2001 | Fujita et al. | |
| 6,476,575 B1 | | 11/2002 | Fainstein et al. | |
| 2002/0016648 A1 | | 2/2002 | Fujita et al. | |
| 2004/0167659 A1 | * | 8/2004 | Scherer ........................... | 700/173 |
| 2007/0088455 A1 | | 4/2007 | Fraunhofer | |
| 2010/0247261 A1 | * | 9/2010 | Hamann et al. ................. | 409/131 |

FOREIGN PATENT DOCUMENTS
WO    WO2004/077181    9/2004

OTHER PUBLICATIONS

"Machine Tool Productivity with iAdapt." 2004 GE Fanuc Automation, Inc. GE Fanuc Automation Information Centers. www.gefanuc.com/cnc.
PCT Search Report issued in connection with corresponding WO Patent Application No. US09/49572 filed on Jul. 2, 2009.

* cited by examiner

*Primary Examiner* — Kakali Chaki
*Assistant Examiner* — Sivalingam Sivanesan
(74) *Attorney, Agent, or Firm* — Wood, Phillips, Katz, Clark & Mortimer

(57) ABSTRACT

A method, system, and apparatus for an adaptive controller for controlling a machining operation on a workpiece by a machining tool are provided. The system includes a sensor for measuring a present value of a spindle load on a spindle drive, and an adaptive controller for comparing the present value of the spindle load to a present value of a target spindle load. The adaptive controller includes a computing element configured to determine a first feed rate value of a machining tool, and a number generator configured to generate a first feed rate dither adjustment value used for adding noise to the first feed rate value. The adaptive controller is configured to control the feed rate of the machining tool relative to the workpiece to maintain the present value of the spindle load approximately equal to the present value of the target spindle load using one or more of the first feed rate value, the first feed rate dither adjustment value, and the second feed rate dither adjustment value.

21 Claims, 3 Drawing Sheets

METHOD, SYSTEM AND APPARATUS FOR ON-DEMAND INTEGRATED ADAPTIVE CONTROL OF MACHINING OPERATIONS

BACKGROUND OF THE INVENTION

The invention relates to adaptive control of the operations of CNC operated machine tools wherein a feed rate of the CNC operated machine tool relative to a workpiece is continuously adjusted during a machining operation in response to inputs received from sensors regarding a load on a spindle drive.

In a CNC operated machine, a program for cutting the workpiece provides a feed rate to a feeding device instructing the feeding device to feed the machining tool used to cut into the workpiece at the specified feed rate. The feed rate and other parameters provided by the program are normally fixed based on expected pre-programmed cutting conditions, including the type of material to be machined, the type of tool used, and the cutting depth of the tool into the surface of the workpiece. However, conventional CNC operated machines do not take into consideration changes in these parameters either before or during the machining operation, and are thus unable to optimize the machining operation to increase efficiency of the machining operation as a whole.

State-of-the-art adaptive control methods for optimizing machining operations can adjust the feed rate of the machining operation based on various measurements and calculations performed during the machining operation. These optimizing methods noticeably improve the efficiency of the machining operation. Unfortunately, although the feed rate of the spindle drive can be continuously adjusted; such adjustments could become cyclical and induce a resonant vibration. If such vibration matches the resonance frequency or harmonics of the resonance frequency of the CNC operated machine or other components, the effect of the vibration can be amplified and could damage the machine, its components, and cause machining errors with the workpiece being machined at the time.

Similarly, when optimizing machining operations, it may seem counter-productive to permit an operator to over-ride the optimizing methods used by state-of-the-art adaptive control systems. As such, these systems typically operate with either the adaptive control methods enabled or disabled, but do not include the ability of the operator to adjust a target feed rate, target spindle load on the spindle drive, or other parameters which might adversely affect the CNC operated machines' ability to optimize the machining operations.

Lastly, some state-of-the-art optimizing systems have been implemented as external hardware or software add-ons retrofitted to existing CNC operated machines but not embedded into the device itself where it has access to all aspects of the system parameters.

BRIEF DESCRIPTION OF THE INVENTION

In one aspect of the invention, an adaptive controller for controlling a machining operation on a workpiece by a machining tool includes a computing element configured to determine a first feed rate value of a machining tool, and a number generator communicatively coupled to said computing element. The number generator is configured to generate a first feed rate dither adjustment value used for adding noise to the first feed rate value. The number generator is also configured to receive a second feed rate dither adjustment value, wherein the second feed rate dither adjustment value is a previously generated feed rate dither adjustment value. The adaptive controller is configured to control a feed rate of the machining tool to maintain a present value of a spindle load approximately equal to a present value of the target spindle load using one or more of the first feed rate value, the first feed rate dither adjustment value, and the second feed rate dither adjustment value.

In another aspect of the invention, an adaptive control system for controlling a machining operation on a workpiece by a machining tool includes a sensor for measuring a present value of a spindle load on a spindle drive, and an adaptive controller for comparing the present value of the spindle load to a present value of a target spindle load. The adaptive controller includes a computing element configured to determine a first feed rate value of a machining tool, and a number generator configured to generate a first feed rate dither adjustment value used for adding noise to the first feed rate value. The adaptive controller is configured to control the feed rate of the machining tool relative to the workpiece to maintain the present value of the spindle load approximately equal to the present value of the target spindle load using one or more of the first feed rate value, the first feed rate dither adjustment value, and the second feed rate dither adjustment value.

In another aspect of the invention, a method of controlling a machining operation on a workpiece by a machining tool includes measuring a present value of a spindle load developed by a spindle drive rotating a machining tool, comparing the present value of the spindle load to a present value of a target spindle load, determining a first feed rate value for the machining tool using the comparison, generating a first feed rate dither adjustment value, and combining the first feed rate dither adjustment value with the first feed rate value such that noise is added to the first feed rate value based on the first feed rate dither adjustment value. The method then includes controlling the feed rate of the machining tool relative to the workpiece to maintain the present value of the spindle load approximately equal to the present value of the target spindle load using one or more of the first feed rate value, the first feed rate dither adjustment value, and the second feed rate dither adjustment value.

DETAILED DESCRIPTION OF THE INVENTION

Embodiments of the present invention include multiple improvements over known adaptive control systems. Specifically, an embodiment addresses a method to activate and deactivate the adaptive control system based on certain thresholds, including a method of overriding the system thresholds. In addition, the embodiment addresses a method of avoiding harmonic disturbances in a machining device by adjusting the speed of operations of the CNC-operated machine by various methods. In another embodiment, the adaptive control system is embedded into the CNC-operated machine to enable access to more detailed information from the CNC-operated machine by becoming part of the machine instead of being retrofitted onto an existing CNC operated machine as an external device or add-on software.

Figure 1:
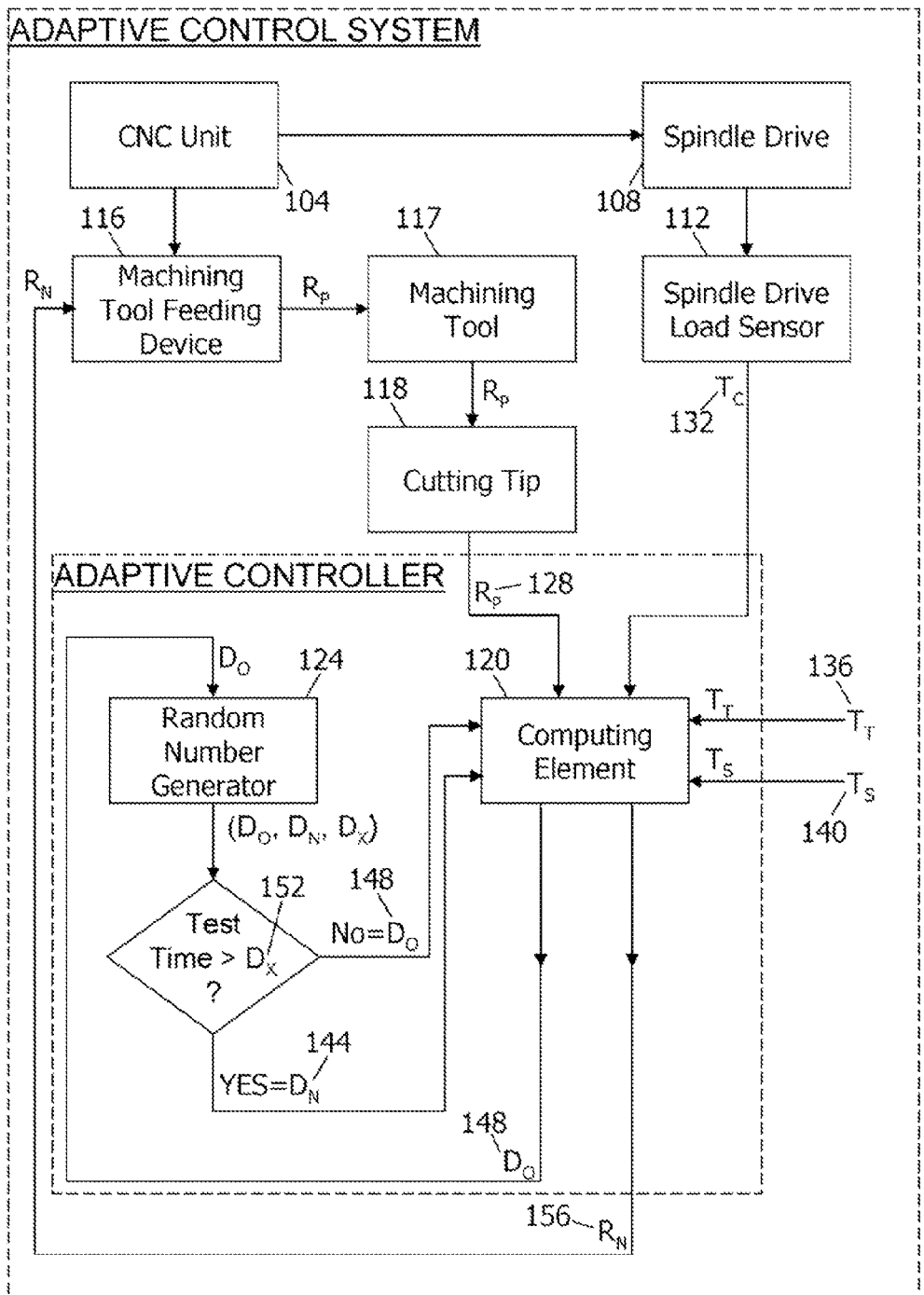
FIG. 1 is a block diagram of a method of controlling a machining operation on a workpiece by a machining tool in accordance with an exemplary embodiment of the present invention.

FIG. 1 is a block diagram of an adaptive control system 100 for controlling a machining operation on a workpiece (not shown) in accordance with an exemplary embodiment of the present invention. In the exemplary embodiment, adaptive control system 100 includes a CNC unit 104, a spindle drive 108 including a spindle drive load sensor 112, a machining tool feeding device 116, a machining tool 117, and a cutting tip 118. Adaptive control system 100 also includes an adaptive controller 119 which includes a computing element 120 configured to perform certain comparisons and calculations, and a random number generator 124.

During operation, machining tool 117 rotates about a rotational axis (not shown) on a spindle drive 108. As machining tool 117 cuts into the workpiece at a present second feed rate ($R_P$) value 128, a resistance force is generated opposing the rotation of spindle drive 108. To continue its rotation, spindle drive 108 must overcome the resistance force. The rotational force necessary to maintain the rotation speed of a spindle drive at any given time is a spindle load ($T_C$) value 132 which is measured by spindle drive load sensor 112.

Computing element 120 receives spindle load value 132 from spindle drive load sensor 112, second feed rate value 128 from machining tool feeding device 116, a target spindle load ($T_T$) value 136 and a spindle load scaling parameter ($T_S$) value 140, and either a new first feed rate dither adjustment ($D_N$) value 144 or an old second feed rate dither adjustment ($D_O$) value 148 from random number generator 124. Random number generator 124 provides computing element 120 either first feed rate dither adjustment value 144 or second feed rate dither adjustment value 148 depending on whether a dither expiration ($D_X$) 152 time period has lapsed from when a most recent previously generated second feed rate dither adjustment value 148 was generated by random number generator 124. If dither expiration 152 time period has lapsed, then random number generator 124 outputs first feed rate dither adjustment value 144, otherwise random number generator 124 outputs second feed rate dither adjustment value 148 for computing element 120 to use in its calculations.

In the exemplary embodiment, target spindle load value 136 is received from one or more of a user and a control system communicatively coupled to the adaptive controller. Target spindle load value 136 is the spindle load that adaptive control system 100 is configured to maintain while the adaptive controller method is enabled. Target spindle load value 136 may be the maximum spindle load a cutting tip 118 can safely handle, or it may be any other spindle load value received from one or more of a user and a control system communicatively coupled to the adaptive controller.

In the exemplary embodiment, if a spindle load scaling feature is enabled, spindle load scaling parameter value 140 is provided by the user. In an alternative embodiment, if a spindle load scaling feature is enabled, spindle load scaling parameter value 140 is provided by a control system communicatively coupled to the adaptive controller. Spindle load scaling parameter value 140 may increase or decrease target spindle load value 136 effectively permitting a user of adaptive control system 100 to over-ride target spindle load value 136. It is recognized that an experienced user might adjust target spindle load value 136 to increase or decrease the feed rate of the machining tool 117 for various reasons. It is expected that this over-ride feature would be utilized to decrease target spindle load value 136 which would decrease second feed rate value 128 of adaptive control system 100.

Random number generator 124 is used to generate random first feed rate dither adjustment value 144 every dither expiration 152 time period. If dither expiration 152 time period has not lapsed, random number generator 124 outputs a most recent previously generated second feed rate dither adjustment value 148. When a spindle dither feature is enabled, either first feed rate dither adjustment value 144 or second feed rate dither adjustment value 148 is used to adjust first feed rate ($R_N$) value 156 causing machining tool 117 to randomly change movement rates and patterns at certain dither expiration 152 intervals. The dithering of first feed rate value 156 ensures that potential vibrations caused by machining tool 117 cutting into the workpiece (not shown) do not match the resonant frequency or harmonic frequencies of adaptive control system 100 or one or more components of adaptive control system 100. Similarly, if the potential vibration frequencies do match, the dithering of first feed rate value 156 ensures that the frequencies do not match for more than dither expiration 152 time period. The result of matching resonant or harmonic frequencies could amplify the movement of machining tool 117 and damage one or more components of adaptive control system 100 or the workpiece being machined at the time. In an alternative embodiment, the rotation speed of the machining tool 117 may be adjusted based on the output of random number generator 124. In another alternative embodiment, both the rotation speed of the machining tool and the feed rate of the machining tool may be adjusted based on the output of the random number generator 123.

Having received the above parameters, computing element 120 calculates first feed rate value 156, used to maintain present spindle load value 132 load approximately equal to target spindle load value 136 load as adjusted by spindle load scaling parameter value 140. In the exemplary embodiment, computing element 120 uses one or more of the feedback scaler, dead band, Proportional-Integral-Differential (PID), slew control, maximum/minimum limit, and feed scaler calculations as detailed in the prior art below to determine first feed rate value 156. In other alternative embodiments, computing element 120 may use other calculations to determine the new first feed rate value 156, such as a ratio of target spindle load value 136 to present spindle load value 132. Computing element 120 outputs first feed rate value 156 to machining tool feeding device 116 which adjusts second feed rate value 128 to match that of first feed rate value 156. Thus, the above described method allows adaptive control system 100 to maintain a spindle load value 132 load approximately equal to target spindle load value 136 load.

Figure 2:
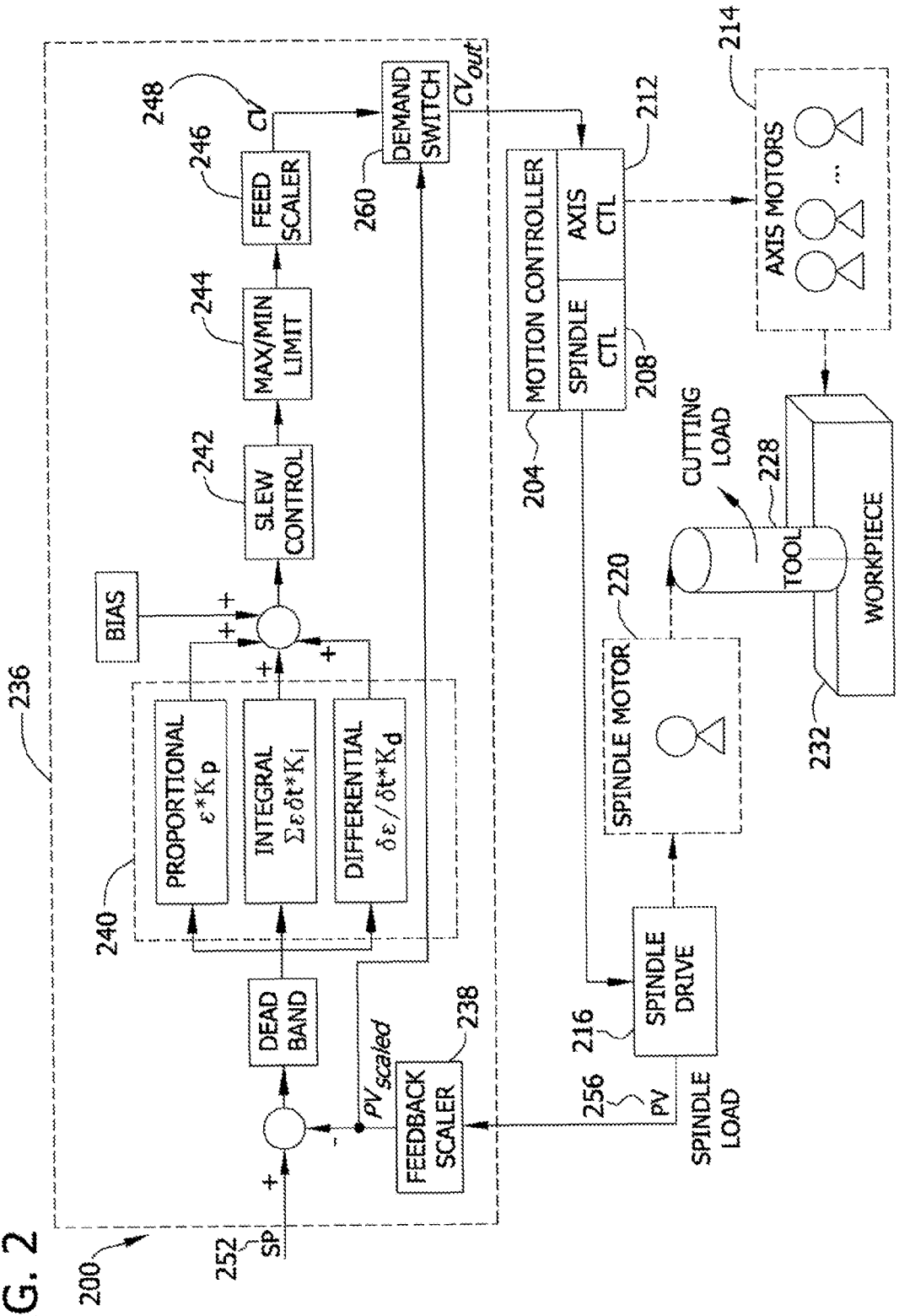
FIG. 2 is a block diagram of prior art; a current state-of-the-art adaptive control system lacking the features of one or more exemplary embodiments of the present invention.

FIG. 2 is a block diagram of a current state-of-the-art adaptive control system in the prior art. An adaptive control system 200 includes a motion controller 204 including a spindle controller 208 used to control a spindle drive 216 which includes a spindle motor 220, and an axis controller 212 used to control axis motors 214. Motion controller 204 can accept path feedrate changes through an external input (not shown). Spindle drive 216 can output an analog representation of a spindle load at spindle drive 216 while spindle drive 216 rotates cutting tool 228 cutting into a workpiece 232. Adaptive control system 200 also includes an adaptive controller 236 which calculates a path feedrate based on the difference between the target load and the load represented by spindle drive 216. Adaptive controller 236 uses a feedback scaler 238, a Proportional/Integral/Differential (PID) algorithm 240, a slew control 242, a maximum/minimum limit 244, and a feed scaler 246 to calculate a control variable (CV) 248 based on a target set point (SP) 252 value and a process variable (PV) 256. A demand switch 260 is used to enable and disable motion controller 204. Set point 252 represents the desired load for the spindle drive, and process variable 256 represents the spindle load from spindle drive 216. The steps are as follows: feedback scaler 238 adjusts the spindle load measurement to integrate into the CNC machine; Proportional-Integral-Differential (PID) algorithm is used to calculate a control variable before adjustments by slew control, max/min limiter and feed scaler; slew control 242 only allows the corrective output to change by a maximum amount; maximum/minimum limiting process 244 restricts the maximum and minimum range of the corrective output; and feed scaler 246 adjusts control variable 248 to the needs of the CNC machining system to which adaptive control system 200 is attached or within which it is installed. Adaptive controller 236 outputs control variable 248 when process variable 256 is greater than or equal to an arming limit (not shown).

Adaptive controller 236 sets the feedrate of spindle drive 216 to zero when the calculated control variable 248 drops process variable 256 below a low threshold value (not shown).

Figure 3:
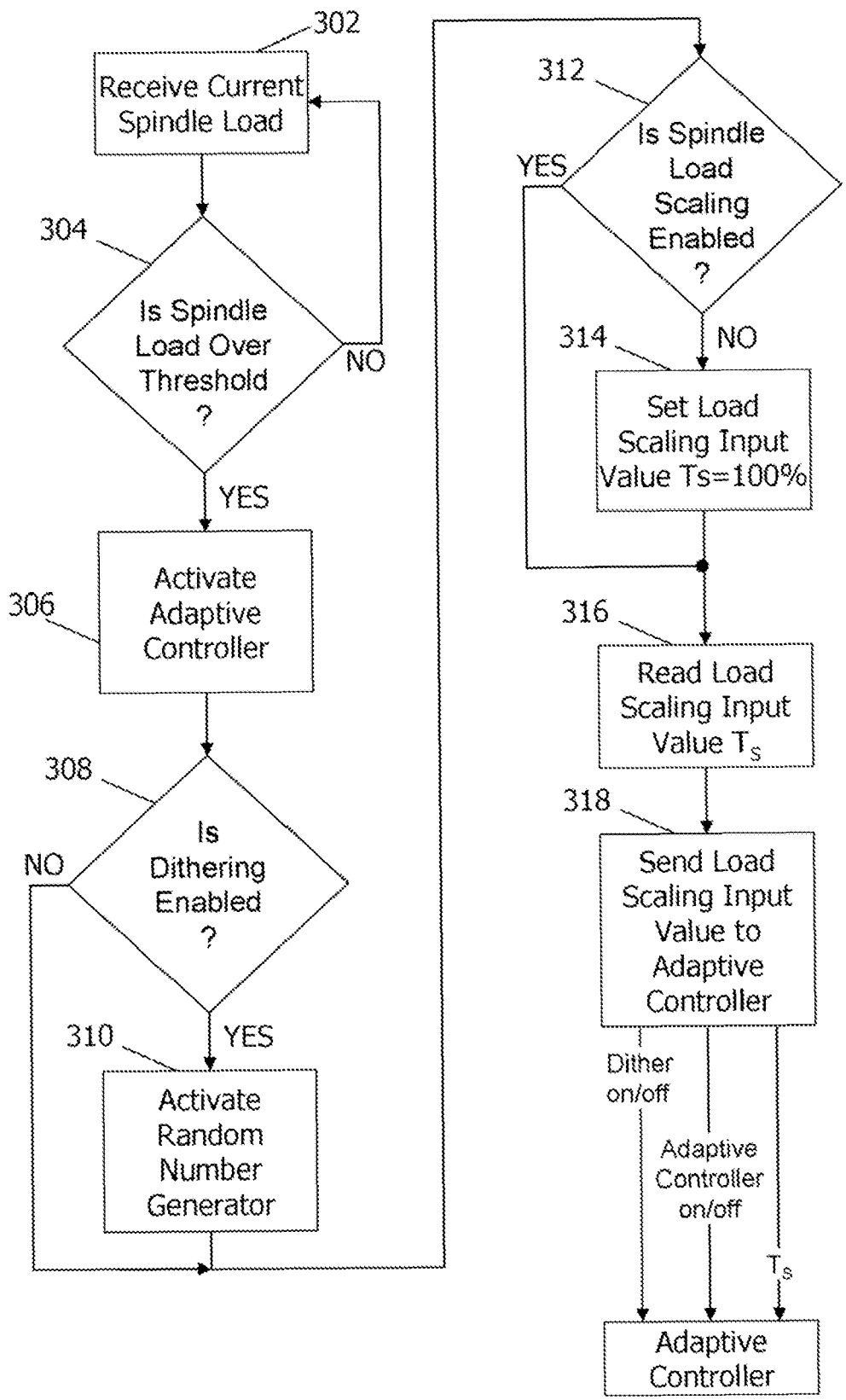
FIG. 3 is a flow chart illustrating an exemplary embodiment of an adaptive control system having an adaptive controller as shown in FIG. 1.
Figure 1:
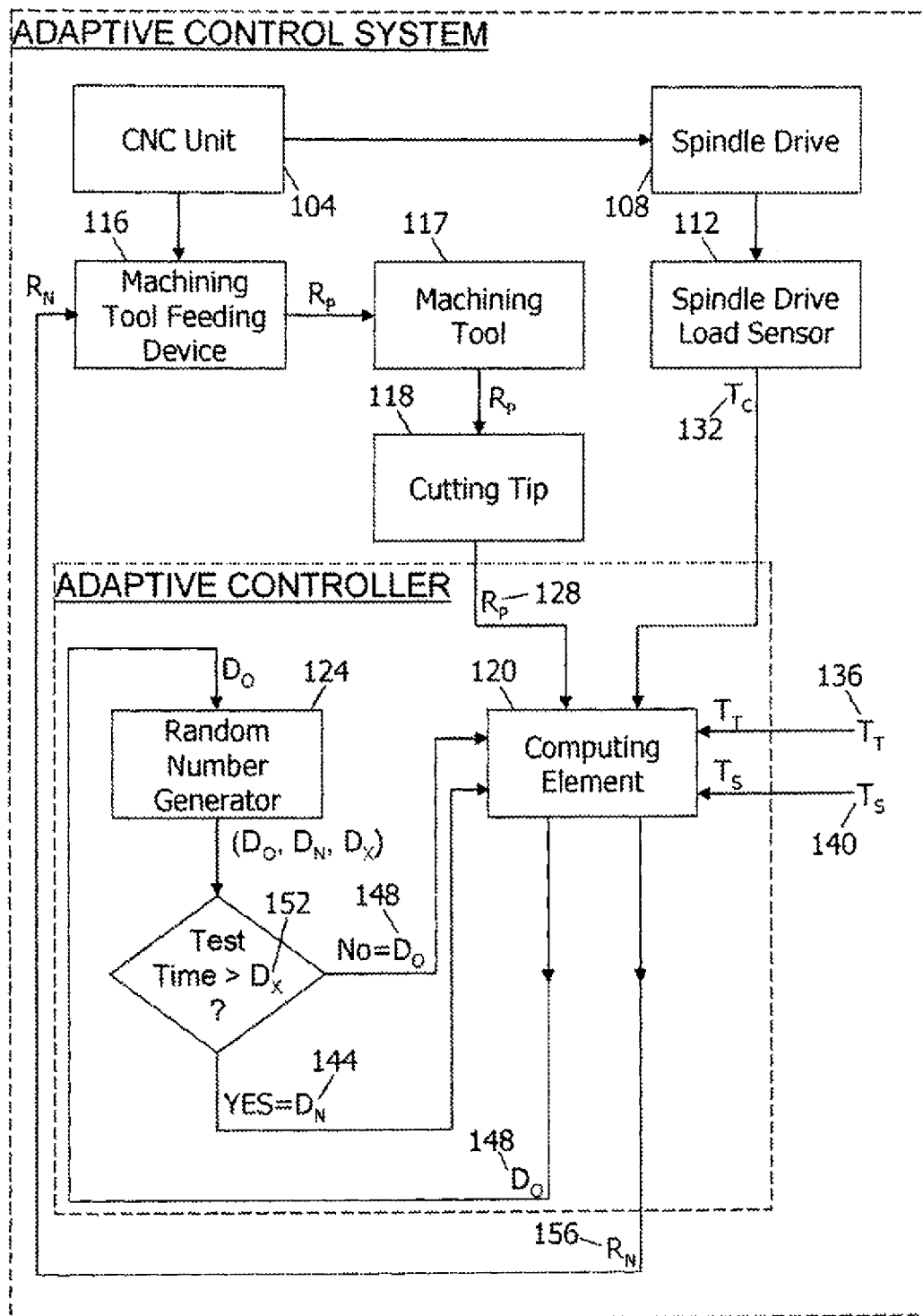
Figure 2:
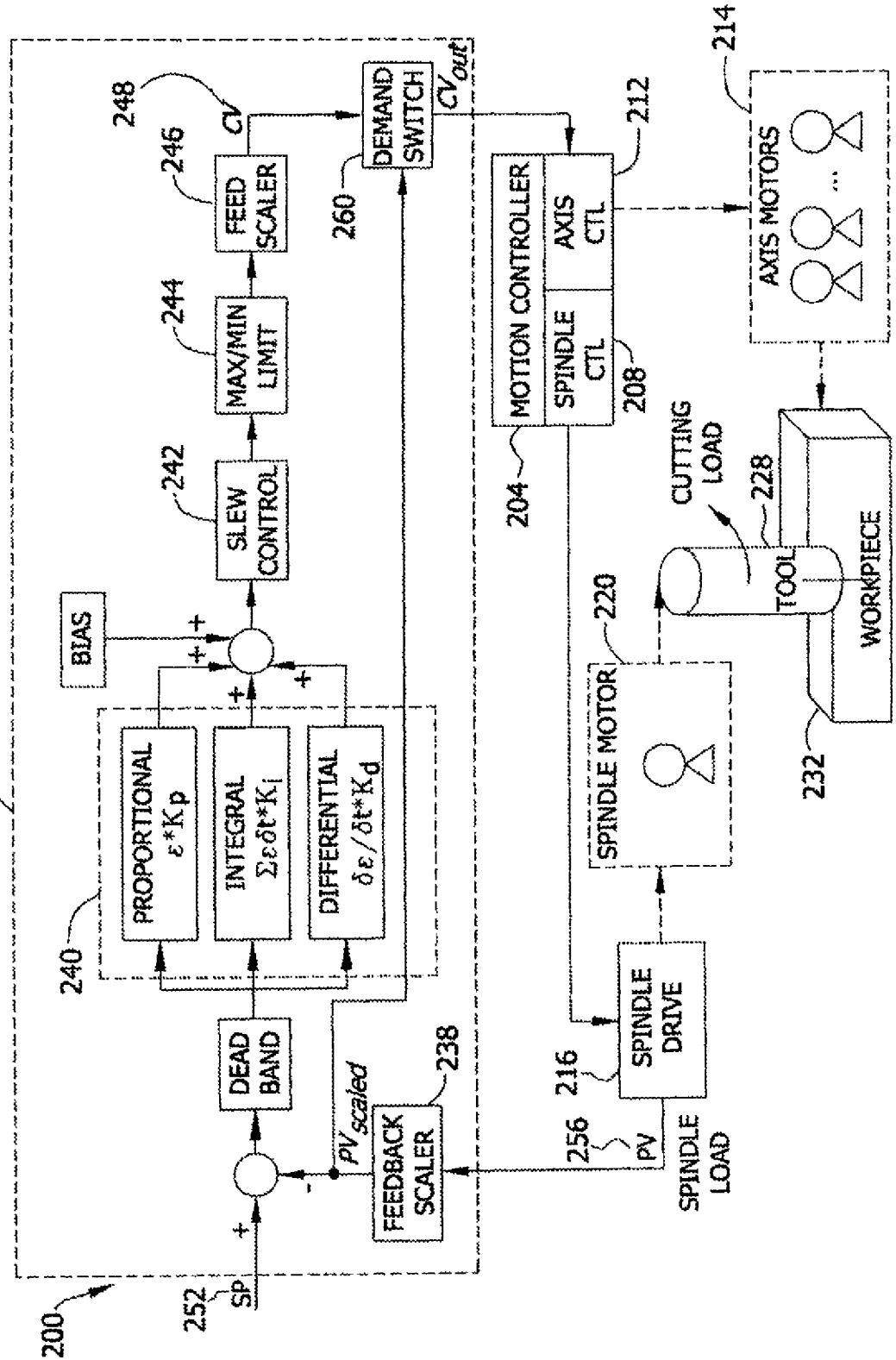
Figure 3:
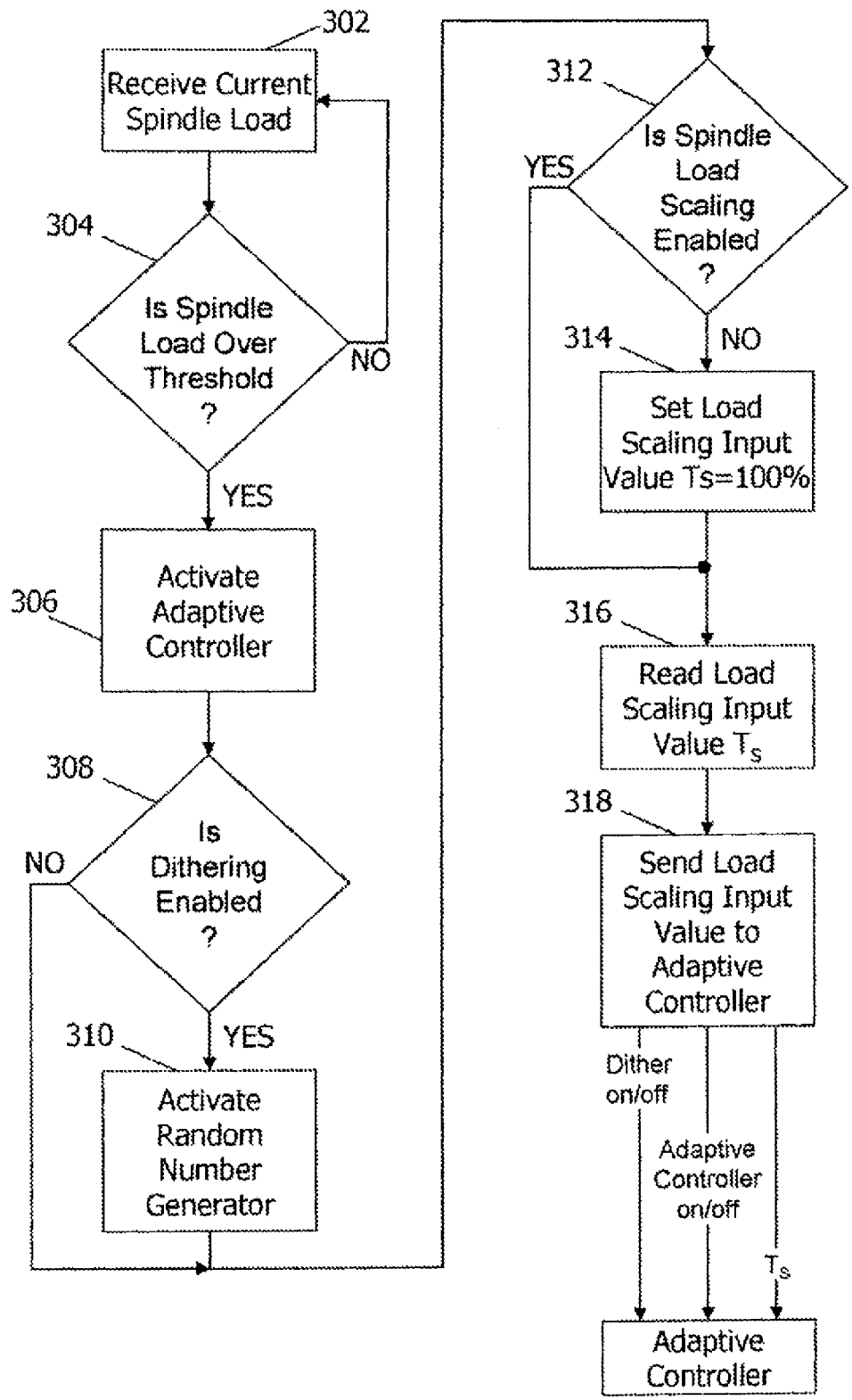

FIG. 3 is a flow diagram 300 illustrating an exemplary embodiment of adaptive control system 100 (shown in FIG. 1) including adaptive controller 119 (shown in FIG. 1). The adaptive control system receives 302 a present value of spindle load 132 (shown in FIG. 1) from spindle drive load sensor 112 (shown in FIG. 1) and compares 304 the present value of spindle load 132 with a pre-determined spindle load threshold. If the present value of spindle load 132 is substantially equal to or greater than a pre-determined spindle load threshold, adaptive control system 100 activates 306 adaptive controller 119. Adaptive control system 100 determines 308 if spindle dithering is enabled, and if so, adaptive control system 100 activates 310 random number generator 124 (shown in FIG. 1). Adaptive control system 100 determines 312 if spindle load scaling parameter value 140 (shown in FIG. 1) has been provided. If spindle load scaling parameter value 140 has not been provided, adaptive control system 100 sets 314 the spindle load scaling parameter value 140 to 100% to maintain the present target spindle load value 136. If spindle load scaling parameter value 140 has been provided, adaptive control system 100 receives 316 a value for spindle load scaling parameter 140 from the user. Adaptive control system 100 then communicates 318 spindle load scaling parameter value 140, an activation signal for adaptive controller 119, and an activation signal for random number generator 124, to adaptive controller 119 for further processing as described herein.

Exemplary embodiments of On-Demand Integrated Adaptive Control of Machining Operations are described above in detail. The apparatus, methods and systems are not limited to the specific embodiments described herein, but rather, components of systems and/or steps of the methods may be utilized independently and separately from other components and/or steps described herein. For example, the methods may also be used in combination with other CNC machining and machining operations systems and methods, and are not limited to practice with only the methods and systems as described herein. Rather, the exemplary embodiment can be implemented and utilized in connection with many other CNC machining applications.

While the invention has been described in terms of various specific embodiments, those skilled in the art will recognize that the invention can be practiced with modification within the spirit and scope of the claims.

What is claimed is:

1. An adaptive controller for controlling a machining operation on a workpiece by a machining tool, said adaptive controller comprising:
a computing element configured to determine a first feed rate value of a machining tool;
a number generator communicatively coupled to said computing element, said number generator configured to generate a first feed rate dither adjustment value, the first feed rate dither adjustment value used for adding noise to the first feed rate value, said number generator configured to receive a second feed rate dither adjustment value, wherein the second feed rate dither adjustment value is a previously generated feed rate dither adjustment value;
said adaptive controller configured to control a feed rate of the machining tool to maintain a present value of a spindle load approximately equal to a present value of the target spindle load using one or more of the first feed rate value, the first feed rate dither adjustment value, and the second feed rate dither adjustment value.

2. An adaptive controller according to claim 1, wherein said adaptive controller is configured to receive the present value of the target spindle load from one or more of a user and a control system communicatively coupled to the adaptive controller.

3. An adaptive controller according to claim 2, wherein said adaptive controller is configured to be activated only after the present value of the spindle load exceeds a threshold spindle load value, said adaptive controller configured to receive the threshold spindle load value from one or more of a user and a control system communicatively coupled to the adaptive controller.

4. An adaptive controller according to claim 3, wherein said adaptive controller is configured to adjust the present value of the target spindle load using a spindle load scaling parameter that, one or more of increases and decreases the present value of the target spindle load, said adaptive controller is further configured to receive the spindle load scaling parameter from one or more of a user and a control system communicatively coupled to the adaptive controller.

5. An adaptive controller according to claim 4, wherein said adaptive controller is configured to pause the feed rate of the machining tool relative to the workpiece by setting the first feed rate value to zero while the present value of the target spindle load, after being adjusted with the spindle load scaling parameter, is less than the threshold spindle load value.

6. An adaptive controller according to claim 1, wherein said number generator generates one or more of a random and pseudo-random first feed rate dither adjustment value from within a range of values having a minimum value and a maximum value, said number generator configured to receive the minimum value and the maximum value from one or more of a user and a control system communicatively coupled to the adaptive controller.

7. An adaptive controller according to claim 6, wherein said number generator is configured to generate a first feed rate dither adjustment value only after a predetermined time period has elapsed after a previous second feed rate dither adjustment value was generated by said number generator, said number generator configured to receive the time period value from one or more of a user and a control system communicatively coupled to the adaptive controller.

8. An adaptive control system for controlling a machining operation on a workpiece by a machining tool, said system comprises:
a sensor for measuring a present value of a spindle load on a spindle drive; and
an adaptive controller for comparing the present value of the spindle load to a present value of a target spindle load, said adaptive controller includes:
a computing element configured to determine a first feed rate value of a machining tool, and a number generator configured to generate a first feed rate dither adjustment value, the first feed rate dither adjustment value used for adding noise to the first feed rate value;

said adaptive controller configured to control the feed rate of the machining tool relative to the workpiece to maintain the present value of the spindle load approximately equal to the present value of the target spindle load using one or more of the first feed rate value, the first feed rate dither adjustment value, and a second feed rate dither adjustment value.

9. An adaptive control system according to claim 8, wherein said adaptive controller is configured to receive the present value of the target spindle load from one or more of a user and a control system communicatively coupled to the adaptive controller.

10. An adaptive control system according to claim 9, wherein said adaptive controller is configured to be activated only after the present value of the spindle load exceeds a threshold spindle load value, said adaptive controller configured to receive the threshold spindle load value from one or more of a user and a control system communicatively coupled to the adaptive controller.

11. An adaptive control system according to claim 10, wherein said adaptive controller is configured to adjust the present value of the target spindle load with a spindle load scaling parameter that, one or more of, increases and decreases the present value of the target spindle load, said adaptive controller is configured to receive the spindle load scaling parameter from one or more of a user and a control system communicatively coupled to the adaptive controller.

12. An adaptive control system according to claim 11, wherein said adaptive controller is configured to pause the feed rate of the machining tool relative to the workpiece by adjusting the feed rate to zero while the present value of the target spindle load, after being adjusted with the spindle load scaling parameter, is less than the threshold spindle load value.

13. An adaptive control system according to claim 8, wherein said number generator generates the first feed rate dither adjustment value from within a range of values having a minimum value and a maximum value, said number generator configured to receive the minimum value and the maximum value from one or more of a user and a control system communicatively coupled to the adaptive controller.

14. An adaptive control system according to claim 13, wherein said number generator generates a new, first feed rate dither adjustment value only after a predetermined time period has elapsed after a previous, second feed rate dither adjustment value was generated by said number generator, said number generator configured to receive the time period value from one or more of a user and a control system communicatively coupled to the adaptive controller.

15. A method of controlling a machining operation on a workpiece by a machining tool, said method comprises:
measuring a present value of a spindle load developed by a spindle drive rotating a machining tool;
comparing the present value of the spindle load to a present value of a target spindle load;
determining a first feed rate value for the machining tool using the comparison;
generating a first feed rate dither adjustment value;
combining the first feed rate dither adjustment value with the first feed rate value such that noise is added to the first feed rate value based on the first feed rate dither adjustment value; and
controlling the feed rate of the machining tool relative to the workpiece to maintain the present value of the spindle load approximately equal to the present value of the target spindle load using one or more of the first feed rate value, the first feed rate dither adjustment value, and a second feed rate dither adjustment value.

16. A method according to claim 15, further comprising receiving the present value of the target spindle load from one or more of a user and a control system communicatively coupled to the adaptive controller.

17. A method according to claim 15, further comprising adjusting the present value of the target spindle load using a spindle load scaling parameter that, one or more of, increases and decreases the present value of the target spindle load.

18. A method according to claim 17, further comprising receiving the spindle load scaling parameter value from one or more of a user and a control system communicatively coupled to the adaptive controller.

19. A method according to claim 15, further comprising randomly generating the first feed rate dither adjustment value from within a predetermined range of values having a minimum value and a maximum value, wherein the minimum value and the maximum value are received from one or more of a user and a control system communicatively coupled to the adaptive controller.

20. A method according to claim 19, further comprising generating the first feed rate dither adjustment value only after a predetermined time period has elapsed after a previous second feed rate dither adjustment value has been generated.

21. A method according to claim 19, further comprising receiving the time period value from one or more of a user and a control system communicatively coupled to the adaptive controller.

* * * * *

UNITED STATES PATENT AND TRADEMARK OFFICE
CERTIFICATE OF CORRECTION

PATENT NO. : 8,135,491 B2  
APPLICATION NO. : 13/056804  
DATED : March 13, 2012  
INVENTOR(S) : Jerry Gene Scherer Page 1 of 10

It is certified that error appears in the above-identified patent and that said Letters Patent is hereby corrected as shown below:

Please delete Patent No. 8,135,491 B2 in its entirety and insert Patent No. 8,135,491 B2 in its entirety as attached.

Signed and Sealed this  
Third Day of September, 2013

Teresa Stanek Rea  
*Acting Director of the United States Patent and Trademark Office*

(12) United States Patent
Scherer

(10) Patent No.: US 8,135,491 B2
(45) Date of Patent: Mar. 13, 2012

(54) METHOD, SYSTEM AND APPARATUS FOR ON-DEMAND INTEGRATED ADAPTIVE CONTROL OF MACHINING OPERATIONS

(75) Inventor: Jerry Gene Scherer, Ashton, IL (US)

(73) Assignee: Fanuc FA America Corporation, Hoffman Estates, IL (US)

(*) Notice: Subject to any disclaimer, the term of this patent is extended or adjusted under 35 U.S.C. 154(b) by 0 days.

(21) Appl. No.: 13/056,804

(22) PCT Filed: Jul. 2, 2009

(86) PCT No.: PCT/US2009/049572
§ 371 (c)(1),
(2), (4) Date: Jan. 31, 2011

(87) PCT Pub. No.: WO2010/014348
PCT Pub. Date: Feb. 4, 2010

(65) Prior Publication Data
US 2011/0137448 A1 Jun. 9, 2011

Related U.S. Application Data

(63) Continuation of application No. 12/182,248, filed on Jul. 30, 2008, now abandoned.

(51) Int. Cl.
*G06F 19/00* (2011.01)
*B23Q 11/00* (2006.01)
(52) U.S. Cl. .................. 700/173; 409/141
(58) Field of Classification Search .... 700/173; 409/141
See application file for complete search history.

(56) References Cited

U.S. PATENT DOCUMENTS 3,744,353 A * 7/1973 Rohs .................. 82/118
5,638,304 A * 6/1997 Billoud .................. 702/56
(Continued)

FOREIGN PATENT DOCUMENTS
WO WO2004/077181 9/2004

OTHER PUBLICATIONS

"Machine Tool Productivity with iAdapt." 2004 GE Fanuc Automation, Inc. GE Fanuc Automation Information Centers. www.gefanuc.com/cnc.

(Continued)

*Primary Examiner* — Kakali Chaki
*Assistant Examiner* — Sivalingam Sivanesan
(74) *Attorney, Agent, or Firm* — Wood, Phillips, Katz, Clark & Mortimer

(57) ABSTRACT

A method, system, and apparatus for an adaptive controller for controlling a machining operation on a workpiece by a machining tool are provided. The system includes a sensor for measuring a present value of a spindle load on a spindle drive, and an adaptive controller for comparing the present value of the spindle load to a present value of a target spindle load. The adaptive controller includes a computing element configured to determine a first feed rate value of a machining tool, and a number generator configured to generate a first feed rate dither adjustment value used for adding noise to the first feed rate value. The adaptive controller is configured to control the feed rate of the machining tool relative to the workpiece to maintain the present value of the spindle load approximately equal to the present value of the target spindle load using one or more of the first feed rate value, the first feed rate dither adjustment value, and the second feed rate dither adjustment value.

21 Claims, 3 Drawing Sheets

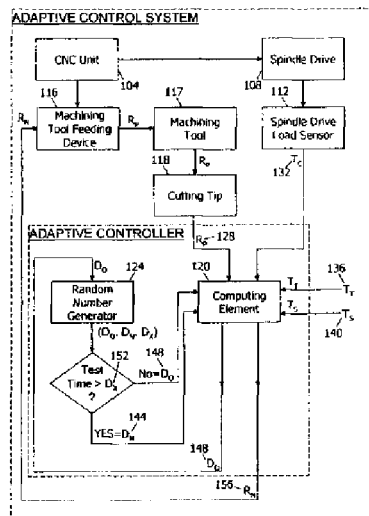

U.S. PATENT DOCUMENTS

| | | | |
|---|---|---|---|
| 5,957,016 A * | 9/1999 | Segalman et al. | 82/1.11 |
| 6,190,098 B1 | 2/2001 | Fujita et al. | |
| 6,476,575 B1 | 11/2002 | Fainstein et al. | |
| 2002/0016648 A1 | 2/2002 | Fujita et al. | |
| 2004/0167659 A1 * | 8/2004 | Scherer | 700/173 |
| 2007/0088455 A1 | 4/2007 | Fraunhofer | |
| 2010/0247261 A1 * | 9/2010 | Hamann et al. | 409/131 |

OTHER PUBLICATIONS

PCT Search Report issued in connection with corresponding WO Patent Application No. US09/49572 filed on Jul. 2, 2009.

* cited by examiner

METHOD, SYSTEM AND APPARATUS FOR ON-DEMAND INTEGRATED ADAPTIVE CONTROL OF MACHINING OPERATIONS

This application is a 371 of PCT/US09/49572 filed Jul. 2, 2009, which is a continuation of U.S. patent application Ser. No. 12/182,248 filed Jul. 30, 2008 now abandoned.

BACKGROUND OF THE INVENTION

The invention relates to adaptive control of the operations of CNC operated machine tools wherein a feed rate of the CNC operated machine tool relative to a workpiece is continuously adjusted during a machining operation in response to inputs received from sensors regarding a load on a spindle drive.

In a CNC operated machine, a program for cutting the workpiece provides a feed rate to a feeding device instructing the feeding device to feed the machining tool used to cut into the workpiece at the specified feed rate. The feed rate and other parameters provided by the program are normally fixed based on expected pre-programmed cutting conditions, including the type of material to be machined, the type of tool used, and the cutting depth of the tool into the surface of the workpiece. However, conventional CNC operated machines do not take into consideration changes in these parameters either before or during the machining operation, and are thus unable to optimize the machining operation to increase efficiency of the machining operation as a whole.

State-of-the-art adaptive control methods for optimizing machining operations can adjust the feed rate of the machining operation based on various measurements and calculations performed during the machining operation. These optimizing methods noticeably improve the efficiency of the machining operation. Unfortunately, although the feed rate of the spindle drive can be continuously adjusted; such adjustments could become cyclical and induce a resonant vibration. If such vibration matches the resonance frequency or harmonics of the resonance frequency of the CNC operated machine or other components, the effect of the vibration can be amplified and could damage the machine, its components, and cause machining errors with the workpiece being machined at the time.

Similarly, when optimizing machining operations, it may seem counter-productive to permit an operator to over-ride the optimizing methods used by state-of-the-art adaptive control systems. As such, these systems typically operate with either the adaptive control methods enabled or disabled, but do not include the ability of the operator to adjust a target feed rate, target spindle load on the spindle drive, or other parameters which might adversely affect the CNC operated machines' ability to optimize the machining operations.

Lastly, some state-of-the-art optimizing systems have been implemented as external hardware or software add-ons retrofitted to existing CNC operated machines but not embedded into the device itself where it has access to all aspects of the system parameters.

BRIEF DESCRIPTION OF THE INVENTION

In one aspect of the invention, an adaptive controller for controlling a machining operation on a workpiece by a machining tool includes a computing element configured to determine a first feed rate value of a machining tool, and a number generator communicatively coupled to said computing element. The number generator is configured to generate a first feed rate dither adjustment value used for adding noise to the first feed rate value. The number generator is also configured to receive a second feed rate dither adjustment value, wherein the second feed rate dither adjustment value is a previously generated feed rate dither adjustment value. The adaptive controller is configured to control a feed rate of the machining tool to maintain a present value of a spindle load approximately equal to a present value of the target spindle load using one or more of the first feed rate value, the first feed rate dither adjustment value, and the second feed rate dither adjustment value.

In another aspect of the invention, an adaptive control system for controlling a machining operation on a workpiece by a machining tool includes a sensor for measuring a present value of a spindle load on a spindle drive, and an adaptive controller for comparing the present value of the spindle load to a present value of a target spindle load. The adaptive controller includes a computing element configured to determine a first feed rate value of a machining tool, and a number generator configured to generate a first feed rate dither adjustment value used for adding noise to the first feed rate value. The adaptive controller is configured to control the feed rate of the machining tool relative to the workpiece to maintain the present value of the spindle load approximately equal to the present value of the target spindle load using one or more of the first feed rate value, the first feed rate dither adjustment value, and the second feed rate dither adjustment value.

In another aspect of the invention, a method of controlling a machining operation on a workpiece by a machining tool includes measuring a present value of a spindle load developed by a spindle drive rotating a machining tool, comparing the present value of the spindle load to a present value of a target spindle load, determining a first feed rate value for the machining tool using the comparison, generating a first feed rate dither adjustment value, and combining the first feed rate dither adjustment value with the first feed rate value such that noise is added to the first feed rate value based on the first feed rate dither adjustment value. The method then includes controlling the feed rate of the machining tool relative to the workpiece to maintain the present value of the spindle load approximately equal to the present value of the target spindle load using one or more of the first feed rate value, the first feed rate dither adjustment value, and the second feed rate dither adjustment value.

BRIEF DESCRIPTION OF THE DRAWINGS

FIG. 1 is a block diagram of a method of controlling a machining operation on a workpiece by a machining tool in accordance with an exemplary embodiment of the present invention.

FIG. 2 is a block diagram of prior art; a current state-of-the-art adaptive control system lacking the features of one or more exemplary embodiments of the present invention.

FIG. 3 is a flow chart illustrating an exemplary embodiment of an adaptive control system having an adaptive controller as shown in FIG. 1.

DETAILED DESCRIPTION OF THE INVENTION

Embodiments of the present invention include multiple improvements over known adaptive control systems. Specifically, an embodiment addresses a method to activate and deactivate the adaptive control system based on certain thresholds, including a method of overriding the system thresholds. In addition, the embodiment addresses a method of avoiding harmonic disturbances in a machining device by adjusting the speed of operations of the CNC-operated machine by various methods. In another embodiment, the adaptive control system is embedded into the CNC-operated machine to enable access to more detailed information from the CNC-operated machine by becoming part of the machine instead of being retrofitted onto an existing CNC operated machine as an external device or add-on software.

FIG. 1 is a block diagram of an adaptive control system 100 for controlling a machining operation on a workpiece (not shown) in accordance with an exemplary embodiment of the present invention. In the exemplary embodiment, adaptive control system 100 includes a CNC unit 104, a spindle drive 108 including a spindle drive load sensor 112, a machining tool feeding device 116, a machining tool 117, and a cutting tip 118. Adaptive control system 100 also includes an adaptive controller 119 which includes a computing element 120 configured to perform certain comparisons and calculations, and a random number generator 124.

During operation, machining tool 117 rotates about a rotational axis (not shown) on a spindle drive 108. As machining tool 117 cuts into the workpiece at a present second feed rate ($R_P$) value 128, a resistance force is generated opposing the rotation of spindle drive 108. To continue its rotation, spindle drive 108 must overcome the resistance force. The rotational force necessary to maintain the rotation speed of a spindle drive at any given time is a spindle load ($T_C$) value 132 which is measured by spindle drive load sensor 112.

Computing element 120 receives spindle load value 132 from spindle drive load sensor 112, second feed rate value 128 from machining tool feeding device 116, a target spindle load ($T_T$) value 136 and a spindle load scaling parameter ($T_S$) value 140, and either a new first feed rate dither adjustment ($D_N$) value 144 or an old second feed rate dither adjustment ($D_O$) value 148 from random number generator 124. Random number generator 124 provides computing element 120 either first feed rate dither adjustment value 144 or second feed rate dither adjustment value 148 depending on whether a dither expiration ($D_X$) 152 time period has lapsed from when a most recent previously generated second feed rate dither adjustment value 148 was generated by random number generator 124. If dither expiration 152 time period has lapsed, then random number generator 124 outputs first feed rate dither adjustment value 144, otherwise random number generator 124 outputs second feed rate dither adjustment value 148 for computing element 120 to use in its calculations.

In the exemplary embodiment, target spindle load value 136 is received from one or more of a user and a control system communicatively coupled to the adaptive controller. Target spindle load value 136 is the spindle load that adaptive control system 100 is configured to maintain while the adaptive controller method is enabled. Target spindle load value 136 may be the maximum spindle load a cutting tip 118 can safely handle, or it may be any other spindle load value received from one or more of a user and a control system communicatively coupled to the adaptive controller.

In the exemplary embodiment, if a spindle load scaling feature is enabled, spindle load scaling parameter value 140 is provided by the user. In an alternative embodiment, if a spindle load scaling feature is enabled, spindle load scaling parameter value 140 is provided by a control system communicatively coupled to the adaptive controller. Spindle load scaling parameter value 140 may increase or decrease target spindle load value 136 effectively permitting a user of adaptive control system 100 to over-ride target spindle load value 136. It is recognized that an experienced user might adjust target spindle load value 136 to increase or decrease the feed rate of the machining tool 117 for various reasons. It is expected that this over-ride feature would be utilized to decrease target spindle load value 136 which would decrease second feed rate value 128 of adaptive control system 100.

Random number generator 124 is used to generate random first feed rate dither adjustment value 144 every dither expiration 152 time period. If dither expiration 152 time period has not lapsed, random number generator 124 outputs a most recent previously generated second feed rate dither adjustment value 148. When a spindle dither feature is enabled, either first feed rate dither adjustment value 144 or second feed rate dither adjustment value 148 is used to adjust first feed rate ($R_N$) value 156 causing machining tool 117 to randomly change movement rates and patterns at certain dither expiration 152 intervals. The dithering of first feed rate value 156 ensures that potential vibrations caused by machining tool 117 cutting into the workpiece (not shown) do not match the resonant frequency or harmonic frequencies of adaptive control system 100 or one or more components of adaptive control system 100. Similarly, if the potential vibration frequencies do match, the dithering of first feed rate value 156 ensures that the frequencies do not match for more than dither expiration 152 time period. The result of matching resonant or harmonic frequencies could amplify the movement of machining tool 117 and damage one or more components of adaptive control system 100 or the workpiece being machined at the time. In an alternative embodiment, the rotation speed of the machining tool 117 may be adjusted based on the output of random number generator 124. In another alternative embodiment, both the rotation speed of the machining tool and the feed rate of the machining tool may be adjusted based on the output of the random number generator 123.

Having received the above parameters, computing element 120 calculates first feed rate value 156, used to maintain present spindle load value 132 load approximately equal to target spindle load value 136 load as adjusted by spindle load scaling parameter value 140. In the exemplary embodiment, computing element 120 uses one or more of the feedback scaler, dead band, Proportional-Integral-Differential (PID), slew control, maximum/minimum limit, and feed scaler calculations as detailed in the prior art below to determine first feed rate value 156. In other alternative embodiments, computing element 120 may use other calculations to determine the new first feed rate value 156, such as a ratio of target spindle load value 136 to present spindle load value 132. Computing element 120 outputs first feed rate value 156 to machining tool feeding device 116 which adjusts second feed rate value 128 to match that of first feed rate value 156. Thus, the above described method allows adaptive control system 100 to maintain a spindle load value 132 load approximately equal to target spindle load value 136 load.

FIG. 2 is a block diagram of a current state-of-the-art adaptive control system in the prior art. An adaptive control system 200 includes a motion controller 204 including a spindle controller 208 used to control a spindle drive 216 which includes a spindle motor 220, and an axis controller 212 used to control axis motors 214. Motion controller 204 can accept path feedrate changes through an external input (not shown). Spindle drive 216 can output an analog representation of a spindle load at spindle drive 216 while spindle drive 216 rotates cutting tool 228 cutting into a workpiece 232. Adaptive control system 200 also includes an adaptive controller 236 which calculates a path feedrate based on the difference between the target load and the load represented by spindle drive 216. Adaptive controller 236 uses a feedback scaler 238, a Proportional/Integral/Differential (PID) algorithm 240, a slew control 242, a maximum/minimum limit 244, and a feed scaler 246 to calculate a control variable (CV) 248 based on a target set point (SP) 252 value and a process variable (PV) 256. A demand switch 260 is used to enable and disable motion controller 204. Set point 252 represents the desired load for the spindle drive, and process variable 256 represents the spindle load from spindle drive 216. The steps are as follows: feedback scaler 238 adjusts the spindle load measurement to integrate into the CNC machine; Proportional-Integral-Differential (PID) algorithm is used to calculate a control variable before adjustments by slew control, max/min limiter and feed scaler; slew control 242 only allows the corrective output to change by a maximum amount; maximum/minimum limiting process 244 restricts the maximum and minimum range of the corrective output; and feed scaler 246 adjusts control variable 248 to the needs of the CNC machining system to which adaptive control system 200 is attached or within which it is installed. Adaptive controller 236 outputs control variable 248 when process variable 256 is greater than or equal to an arming limit (not shown).

Adaptive controller 236 sets the feedrate of spindle drive 216 to zero when the calculated control variable 248 drops process variable 256 below a low threshold value (not shown).

FIG. 3 is a flow diagram 300 illustrating an exemplary embodiment of adaptive control system 100 (shown in FIG. 1) including adaptive controller 119 (shown in FIG. 1). The adaptive control system receives 302 a present value of spindle load 132 (shown in FIG. 1) from spindle drive load sensor 112 (shown in FIG. 1) and compares 304 the present value of spindle load 132 with a pre-determined spindle load threshold. If the present value of spindle load 132 is substantially equal to or greater than a pre-determined spindle load threshold, adaptive control system 100 activates 306 adaptive controller 119. Adaptive control system 100 determines 308 if spindle dithering is enabled, and if so, adaptive control system 100 activates 310 random number generator 124 (shown in FIG. 1). Adaptive control system 100 determines 312 if spindle load scaling parameter value 140 (shown in FIG. 1) has been provided. If spindle load scaling parameter value 140 has not been provided, adaptive control system 100 sets 314 the spindle load scaling parameter value 140 to 100% to maintain the present target spindle load value 136. If spindle load scaling parameter value 140 has been provided, adaptive control system 100 receives 316 a value for spindle load scaling parameter 140 from the user. Adaptive control system 100 then communicates 318 spindle load scaling parameter value 140, an activation signal for adaptive controller 119, and an activation signal for random number generator 124, to adaptive controller 119 for further processing as described herein.

Exemplary embodiments of On-Demand Integrated Adaptive Control of Machining Operations are described above in detail. The apparatus, methods and systems are not limited to the specific embodiments described herein, but rather, components of systems and/or steps of the methods may be utilized independently and separately from other components and/or steps described herein. For example, the methods may also be used in combination with other CNC machining and machining operations systems and methods, and are not limited to practice with only the methods and systems as described herein. Rather, the exemplary embodiment can be implemented and utilized in connection with many other CNC machining applications.

While the invention has been described in terms of various specific embodiments, those skilled in the art will recognize that the invention can be practiced with modification within the spirit and scope of the claims.

What is claimed is:

1. An adaptive controller for controlling a machining operation on a workpiece by a machining tool, said adaptive controller comprising:
   a computing element configured to determine a first feed rate value of a machining tool;
   a number generator communicatively coupled to said computing element, said number generator configured to generate a first feed rate dither adjustment value, the first feed rate dither adjustment value used for adding noise to the first feed rate value, said number generator configured to receive a second feed rate dither adjustment value, wherein the second feed rate dither adjustment value is a previously generated feed rate dither adjustment value;
   said adaptive controller configured to control a feed rate of the machining tool to maintain a present value of a spindle load approximately equal to a present value of the target spindle load using one or more of the first feed rate value, the first feed rate dither adjustment value, and the second feed rate dither adjustment value.

2. An adaptive controller according to claim 1, wherein said adaptive controller is configured to receive the present value of the target spindle load from one or more of a user and a control system communicatively coupled to the adaptive controller.

3. An adaptive controller according to claim 2, wherein said adaptive controller is configured to be activated only after the present value of the spindle load exceeds a threshold spindle load value, said adaptive controller configured to receive the threshold spindle load value from one or more of a user and a control system communicatively coupled to the adaptive controller.

4. An adaptive controller according to claim 3, wherein said adaptive controller is configured to adjust the present value of the target spindle load using a spindle load scaling parameter that, one or more of increases and decreases the present value of the target spindle load, said adaptive controller is further configured to receive the spindle load scaling parameter from one or more of a user and a control system communicatively coupled to the adaptive controller.

5. An adaptive controller according to claim 4, wherein said adaptive controller is configured to pause the feed rate of the machining tool relative to the workpiece by setting the first feed rate value to zero while the present value of the target spindle load, after being adjusted with the spindle load scaling parameter, is less than the threshold spindle load value.

6. An adaptive controller according to claim 1, wherein said number generator generates one or more of a random and pseudo-random first feed rate dither adjustment value from within a range of values having a minimum value and a maximum value, said number generator configured to receive the minimum value and the maximum value from one or more of a user and a control system communicatively coupled to the adaptive controller.

7. An adaptive controller according to claim 6, wherein said number generator is configured to generate a first feed rate dither adjustment value only after a predetermined time period has elapsed after a previous second feed rate dither adjustment value was generated by said number generator, said number generator configured to receive the time period value from one or more of a user and a control system communicatively coupled to the adaptive controller.

8. An adaptive control system for controlling a machining operation on a workpiece by a machining tool, said system comprises:

a sensor for measuring a present value of a spindle load on a spindle drive; and an adaptive controller for comparing the present value of the spindle load to a present value of a target spindle load, said adaptive controller includes:

a computing element configured to determine a first feed rate value of a machining tool, and a number generator configured to generate a first feed rate dither adjustment value, the first feed rate dither adjustment value used for adding noise to the first feed rate value;

said adaptive controller configured to control the feed rate of the machining tool relative to the workpiece to maintain the present value of the spindle load approximately equal to the present value of the target spindle load using one or more of the first feed rate value, the first feed rate dither adjustment value, and a second feed rate dither adjustment value.

9. An adaptive control system according to claim 8, wherein said adaptive controller is configured to receive the present value of the target spindle load from one or more of a user and a control system communicatively coupled to the adaptive controller.

10. An adaptive control system according to claim 9, wherein said adaptive controller is configured to be activated only after the present value of the spindle load exceeds a threshold spindle load value, said adaptive controller configured to receive the threshold spindle load value from one or more of a user and a control system communicatively coupled to the adaptive controller.

11. An adaptive control system according to claim 10, wherein said adaptive controller is configured to adjust the present value of the target spindle load with a spindle load scaling parameter that, one or more of, increases and decreases the present value of the target spindle load, said adaptive controller is configured to receive the spindle load scaling parameter from one or more of a user and a control system communicatively coupled to the adaptive controller.

12. An adaptive control system according to claim 11, wherein said adaptive controller is configured to pause the feed rate of the machining tool relative to the workpiece by adjusting the feed rate to zero while the present value of the target spindle load, after being adjusted with the spindle load scaling parameter, is less than the threshold spindle load value.

13. An adaptive control system according to claim 8, wherein said number generator generates the first feed rate dither adjustment value from within a range of values having a minimum value and a maximum value, said number generator configured to receive the minimum value and the maximum value from one or more of a user and a control system communicatively coupled to the adaptive controller.

14. An adaptive control system according to claim 13, wherein said number generator generates a new, first feed rate dither adjustment value only after a predetermined time period has elapsed after a previous, second feed rate dither adjustment value was generated by said number generator, said number generator configured to receive the time period value from one or more of a user and a control system communicatively coupled to the adaptive controller.

15. A method of controlling a machining operation on a workpiece by a machining tool, said method comprises:

measuring a present value of a spindle load developed by a spindle drive rotating a machining tool;

comparing the present value of the spindle load to a present value of a target spindle load;

determining a first feed rate value for the machining tool using the comparison;

generating a first feed rate dither adjustment value;

combining the first feed rate dither adjustment value with the first feed rate value such that noise is added to the first feed rate value based on the first feed rate dither adjustment value; and controlling the feed rate of the machining tool relative to the workpiece to maintain the present value of the spindle load approximately equal to the present value of the target spindle load using one or more of the first feed rate value, the first feed rate dither adjustment value, and a second feed rate dither adjustment value.

16. A method according to claim 15, further comprising receiving the present value of the target spindle load from one or more of a user and a control system communicatively coupled to the adaptive controller.

17. A method according to claim 15, further comprising adjusting the present value of the target spindle load using a spindle load scaling parameter that, one or more of, increases and decreases the present value of the target spindle load.

18. A method according to claim 17, further comprising receiving the spindle load scaling parameter value from one or more of a user and a control system communicatively coupled to the adaptive controller.

19. A method according to claim 15, further comprising randomly generating the first feed rate dither adjustment value from within a predetermined range of values having a minimum value and a maximum value, wherein the minimum value and the maximum value are received from one or more of a user and a control system communicatively coupled to the adaptive controller.

20. A method according to claim 19, further comprising generating the first feed rate dither adjustment value only after a predetermined time period has elapsed after a previous second feed rate dither adjustment value has been generated.

21. A method according to claim 19, further comprising receiving the time period value from one or more of a user and a control system communicatively coupled to the adaptive controller.

* * * * *